RANDOM NOISE GENERATOR

Filed March 22, 1965

INVENTOR.
KENNETH F. BUEGEL
BY
Orland M. Christensen
ATTORNEY

United States Patent Office 3,519,952
Patented July 7, 1970

3,519,952

RANDOM NOISE GENERATOR

Kenneth F. Buegel, Seattle, Wash., assignor to The Boeing Company, Seattle, Wash., a corporation of Delaware Filed Mar. 22, 1965, Ser. No. 441,592
Int. Cl. H03b *29/00*
U.S. Cl. 331—78 13 Claims This invention relates to a random noise generator, and particularly to a system for generating noise signals characterized by a substantially uniform power spectrum extending to higher frequencies with larger power output than prior noise generator systems have been capable of achieving. While the invention is herein illustrated and described in terms of a particular preferred form, it will be recognized by those skilled in the art that various modifications are possible within the scope of the principles involved.

Certain random signal generators have relied primarily upon the behavior of a single semiconductor device operating in a critical or unstable condition or environment, for example a semiconductor diode operating in the presence of a source of randomly emitted particle radiation. However, such devices are characterized by low power and restricted bandwidth outputs, although randomness may be achieved.

Other noise generators have relied upon the storage of energy, for example in a charged transmission line, and the discharge of that energy into a load to generate a required spectrum of noise. When a charge-discharge cyclic system is used, the amount of power generated is limited by the characteristics of the storage device, and an increase in its capacity reduces its rate of discharge, thereby lowering the upper frequency limit of the generated energy spectrum. Further, if the charge-discharge frequency is increased, then the power density will be greater at frequencies related to the cycle length. The present system seeks to overcome some of the disadvantages of prior random noise generator systems by providing a system the flow of energy through which is randomly gated to travel through various energy transfer paths by a large number of switching elements each operative to shift from one conduction state to another, thereby generating interfering traveling waves in the system, the net effect of which is a random noise signal at the system output.

Accordingly, it is an object of this invention to provide a random signal or noise generator capable of generating signals having larger power spectra of substantially uniform amplitude over a broader frequency band and extending to higher frequencies than heretofore possible, although the principles developed herein are applicable to systems of low frequency capability as well.

A highly important object is to provide a system capable of generating noise signals of greater randomness than heretofore possible, and it is in fact the intention hereof to generate signals having no repeating components measurable by presently known signal analysis systems.

A further object is to provide such a system which is of simple construction and which can be easily fabricated from presently available, relatively inexpensive components.

Still another object is to provide a noise signal generator which does not require the use of storage devices such as transmission lines or the like, and which operates without the use of mechanical switching devices or other movable elements, but is constructed entirely from known electronic components and conductive means having fixed connections.

Briefly, the invention consists in providing a random noise generator comprising an energy source, a plurality of electron devices having first, second and third electrodes and capable of two conduction states, and conductive means interconnecting the electron devices. The conductive means comprises first, second, and third closed conductive energy transfer paths interconnecting the corresponding electrodes of the electron devices, respectively. Additional energy transfer paths in the form of mutual cross-coupling interconnect the conductive energy transfer paths. Means connecting the conductive paths to the energy source render the electron devices operable individually to switch from one conduction state to another in response to energy transfer through the cross-coupling energy transfer paths. Output means are connected between two of the conductive energy transfer paths for extracting random noise energy therefrom. The term "electron device" is intended to mean any signal translating device capable of transmitting or gating energy or signals from one point to another in response to control signals applied to it.

As will be seen, the invention further resides in certain subsidiary features and modes of operation of the system. For example, one of the conductive energy transfer paths preferably consists of a substantially continuous plane or surface of conductive material in the shape of a disk, although the possible configurations are by no means considered limited to those lying in a single plane. The second and third conductive paths preferably comprise separate conductive loops or rings lying adjacent the periphery of the disk with substantially uniform spacing therefrom throughout their respective path lengths. Such paths, hereafter referred to as conductors, are spaced so as to possess mutual coupling across their respective spacings from each other when the generator is in operation. In addition, the conductors themselves posses some inductive reactance to travel of energy along their respective lengths.

The interconnected electron devices or signal translating devices, as they may be called, preferably comprise substantially identical transistors having their emitters connected to the first conductor, that is, the plane or disk, and having their bases and collectors connected, respectively, to the second and third conductors, that is, the rings. The base-connected ring is preferably disposed between the emitter-connected disk (emitter plane) and the collector ring. Bias connections of the rings and the emitter plane to the energy source are such that changes of state of one of the devices cause current-surge waves in the collector ring which travel in both directions around the ring from the collector connection of that device. The mutual coupling among the rings and emitter plane is of sufficient magnitude that in response to such traveling waves in the collector ring, induced traveling waves appear in at least the base ring, the latter traveling waves being of polarity and magnitude to cause changes of state of others of the transistors. The changes of state of transistors spaced around the rings occur at random times, due to random differences in characteristics among the transistors and other factors, as discussed hereinafter. The conduction state of each transistor at any instant is therefore determined by the net collective effect of interfering traveling waves due to switching of all of the interconnected transistors.

Other features, objects and advantages of the invention will be apparent from the following more detailed description of preferred forms thereof, taken in conjunction with the accompanying drawings.

Figures 1, 2, 3:
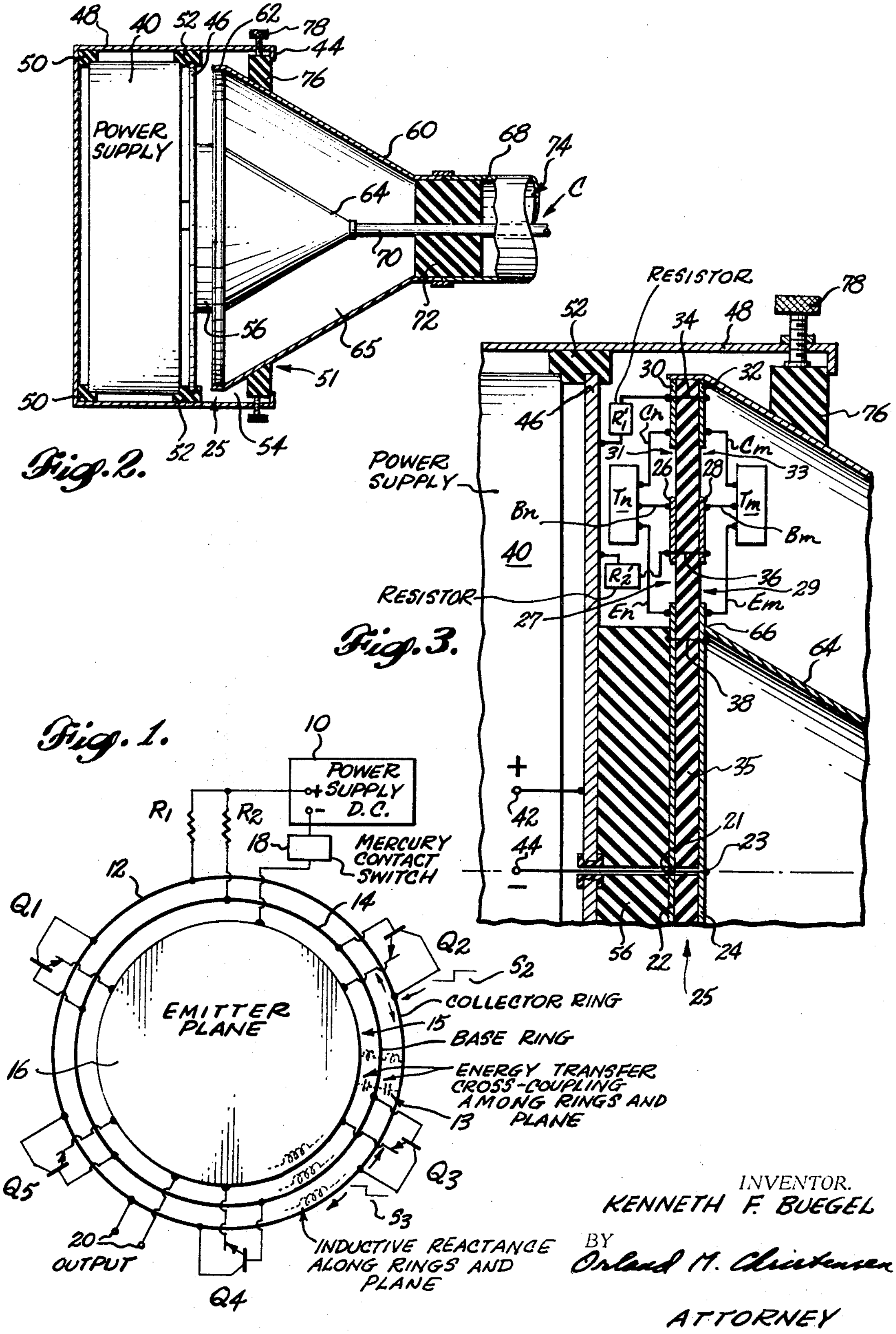
FIG. 1 is a schematic circuit diagram of a random noise generator according to the invention, showing a reduced number of transistors for simplicity of description.
FIG. 2 is a somewhat diagrammatic side view of a physical embodiment of the invention combined with a cone-shaped waveguide or connector for coupling the generator to a coaxial cable or the like to utilize the generated noise energy.
FIG. 3 is an enlarged view of a portion of the system of FIG. 2 showing presently preferred physical details of special power supply connections and output coupling according to the invention.

In the schematic circuit diagram in FIG. 1, the power supply 10 energizes, through suitable connections later discussed, a plurality of three-electrode transistors $Q_1$, $Q_2$, $Q_3$, $Q_4$, and $Q_5$ having their respective corresponding electrodes connected to first, second and third conductive energy paths. One of these paths is the outer conductive ring 12 interconnecting the collectors, the second is the intermediate conductive ring 14 interconnecting the bases, and the third is an inner conductive disk 16, called the emitter plane, interconnecting the emitters of the transistors.

Each ring is capable of transmitting energy along its circumference in both directions. The emitter plane or disk 16 is capable of transmitting energy primarily along its periphery, but it is also characterized by energy transfer paths across its central regions. There are additional energy transfer paths in the form of mutual coupling among the collector and base rings and the emitter plane across the spacings 13 and 15 when the system is in operation. This mutual coupling is both capacitive and inductive.

To establish appropriate operating conditions for the npn type of transistor utilized in this embodiment of the invention, power is delivered through appropriately valued bias resistors $R_1$ and $R_2$ interposed in the connections of the positive terminal of power supply 10 to the collector ring 12 and the base ring 14, respectively. The emitter plane is connected directly to the negative terminal of the power supply through a suitable arc-free contact switch such as the mercury contact switch 18.

Suitable output connections 20 are provided between the collector ring and emitter plane. It will be observed that the transistors are connected in what is generally referred to as the common-emitter amplifier configuration with respect to the energy source 10 and the output means 20. This configuration is found to result in the greatest efficiency and power output of various electrical configurations of the system within the scope of the invention.

Within the capabilities of present manufacturing techniques it is impossible to manufacture a plurality of transistors or other electron devices to have exactly identical characteristics. Further, every transistor has a characteristic delay and rise time for its changing from non-conducting to conducting state, and a characteristic storage time and fall time for changing from conducting state to non-conducting state, in response to applied control voltage pulses or steps. Manufacturing techniques of course seek to produce devices with as nearly identical switching characteristics as it is practicable to achieve, but differences in response times always remain, within the prescribed tolerance limits. Generally speaking, these differences are statistically random for any selected group of devices.

Neither is it possible with known techniques to achieve a true uniformity of spacing between electrical connections of electron devices connected, for example, along the circumference of the conductive rings schematically depicted in FIG. 1. The spacings between connections around the rings and around the emitter plane periphery can also be expected to differ in a statistically random manner when attempts are made to make the spacings identical. Thus the time-lengths of wave propagations between transistor electrode spacings differ randomly due to these differences in physical length and consequent differences in inductive reactance between connections. The present system relies upon these differences for generation of a random signal, as will be seen.

In the illustrated system the bias resistors $R_1$ and $R_2$ and the power supply voltage values are such, at least initially, that all of the transistors $Q_1$ to $Q_5$ are urged into a conductive state. Actually the power supply 10 can be a charged capacitor or the like for discharging energy into the system when the time during which noise energy is required is short and the superimposed exponential decay function can be ignored. Thus when current is supplied by operation of the mercury contact switch 18, all of the transistors can be expected to turn on. However, no transistor becomes conductive immediately, because of the above-mentioned delay and rise times, and since the delay and rise times for the several transistors are different, they do not turn on simultaneously.

After sufficient time has passed following application of energy to the system for, say, transistors $Q_1$, $Q_2$, and $Q_4$ to have turned on, then another transistor, say $Q_3$, turns on at a slightly later time. As $Q_3$ becomes conductive, the voltage at its connection to the collector ring 12 suddenly becomes more negative, the fall time being very short. This sudden voltage change $S_3$ will be propagated around the collector ring in both directions from the $Q_3$ collector connection as indicated.

At the frequencies corresponding to the aforementioned rise and fall times, the collector and base rings and the emitter plane exhibit characteristics similar to coupled delay lines. That is, they exhibit inductive reactance to wave propagated along their circumferences and capacitive and inductive coupling between paths as previously mentioned. Accordingly, the negative step $S_3$ propagating in both directions around the collector ring 12 induces a corresponding negative voltage step in the base ring 14, which is also propagated in both directions. This negative going pulse in the base ring is of a magnitude and polarity to urge any conducting transistor, $Q_1$, $Q_2$ or $Q_4$, into its non-conducting state, the coupling and the bias voltages applied to the rings being such that this is true.

Therefore, when this step or pulse $S_2$ reaches transistor $Q_2$, for example, it initiates switching of that transistor to its non-conductive state. In response to this switching action of $Q_2$, a positive pulse $S_2$ appears at the connection of $Q_2$ to the collector ring 12. This positive surge $S_2$ is in turn propagated in both directions from that connection and induces a corresponding positive surge (not indicated) in the base ring, where it constitutes a turn-on pulse to a non-conducting transistor, such as $Q_5$. Then, as $Q_5$ becomes conductive, it initiates a turn-off pulse to other conducting transistors and this interaction continues. Switchings of the various transistors occur randomly with intervals shorter than a complete propagation time around the rings, so that many traveling waves exist simultaneously and form a composite or collective effect at the terminals of each transistor. Accordingly, the conduction state of each transistor is determined by the net collective effect at its terminals of all the traveling waves propagated in the system.

This effect is an important aspect of the invention, since it results in a mode of operation not dependent upon nor limited by the aforementioned delay, storage and rise and fall times characteristic of the electron devices used in the system. This can best be explained by noting that the interval between arrivals of switching pulses at any particular transistor may be less than its delay or storage time. Switching action may therefore be reversed before it is complete, by arrival of two pulses of opposite polarity in rapid succession. The transistor is thus switched between, say, two partially conducting states, and this can occur more quickly and with much greater frequency than can complete switching. The composite effect of switching of all the transistors can thus be viewed as random gating of energy flow through the system through different paths by switching devices whose operation results in traveling waves having a composite random effect when viewed at the system output.

In general the randomness obtainable by the system can be enhanced in three ways, namely by choosing transistors having as nearly identical characteristics as possible, by choosing a transistor type characterised by the shortest possible response time, and by connecting the transistors with as nearly identical spacings and terminal characteristics as possible. In addition, both randomness and average power output can be increased by increasing the number of transistors connected in the system. One rule of thumb for choosing a number of transistors is to divide the storage time of the transistor type chosen by the reciprocal of the highest frequency component desired. Thus ninety or more transistors are desirable when their storage time is specified as nine nanoseconds and a 10,000 megacycle upper frequency limit is sought. When power output is a critical factor other criteria enter into the choice of the number of transistors employed, such as their individual peak power capabilities.

It will be recognized that the ultra-high frequency signal components attainable by this system create a high energy field not only in the conductive paths, and in the regions therebetween, but also in space surrounding the device. Certain changes in physical configuration of the illustrated device may result in introduction of factors which limit the randomness of the output signal by introducing reflections or other influences causing normally unwanted periodicity in the output signal appearing as peaks in its power spectrum. For example, if the output is actually taken as shown in FIG. 1 from a single pair of terminals, a periodicity factor is introduced related to the wave propagation time around the rings. In addition, introduction of certain types of physical limitations on the configuration of the energy field surrounding the device may place limitations on the randomness of system operation.

One convenient means for extracting the output energy from the system of the configuration illustrated, while imposing relatively few restrictions on the fields involved, is illustrated in FIGS. 2 and 3. The generator system itself (corresponding to the schematic diagram of FIG. 1) includes a generator plate structure 25, as seen in cross-section in FIG. 3, comprising a pair of circular copper disks 22 and 24, a pair of base rings 26 and 28 and a pair of collector rings 30 and 32, all mounted on opposite faces of a circular sheet of glass epoxy 35 or other electrically insulative rigid material. Such a structure can be easily fabricated from a laminated sheet consisting of insulative material having sufficient rigidity and coated on both sides with copper or other conductive material, by machining away the copper in two concentric annular spaces 27, 29 and 32, 33 on each side of the sheet to form the rings 26, 28 and 30, 32, respectively.

Construction of the device in this manner with dual sets of emitter planes (disks) and corresponding base and collector rings on opposite sides of a flat sheet permit connection of a large plurality of transistors $T_n$ and $T_m$ on opposite sides thereof (not shown in FIG. 2) enhancing the randomness of the signal obtainable from the system. In this preferred form of the invention transistors $T_n$ and $T_m$ are of the npn type and are selected from a group of the same manufacture so as to possess as nearly as possible identical characteristics. As previously stated, actual differences will exist, randomly distributed. Their respective collector terminals $C_n$, $C_m$; base terminals $B_n$, $B_m$; and emitter terminals $E_n$, $E_m$ are connected to the rings and plane, respectively, as shown.

Additional connections 34 between opposite collector rings 30 and 32, and connections 36 between opposite base rings 26 and 28, are made through the insulative member 35 to provide more direct energy paths for coupling therebetween.

Energy is supplied to the system from the power supply 40 through positive and negative terminals 42 and 44, respectively, the latter of which is connected internally to a suitable switch, not shown, such as a mercury contact switch. In order to provide a backdrop of uniform potential for the energy field generated by the system, a circular conductive supply plate 46 is interposed between the power supply and the generator system and parallel to the generator plate 25. The power supply 40 is supported within a cylindrical cannister 48 by insulative members 50 and 52 engaging its periphery, the latter also supporting the supply plate 46. The cylindrical cannister 48 concentric with the circular generator plate structure 25 forms an annular cavity 54 around the circumference of the generator plate 25. The forward portion of the cannister 48 terminates in an annular flange 49 defining a circular opening 51 into which the generator plate structure 25 may be inserted during construction.

The plate structure 25 is separated from the supply plate 46 by a circular insulative block 56 of a diameter less than that of the emitter planes 22 and 24 and concentric therewith. The negative terminal 44 of the power supply is connected directly to both emitter planes 22 and 24 at central terminals 21 and 23. The supply plane 46 is connected directly to the positive terminal 42. The collector rings 30 and 32 are connected to the supply plane 46 through a plurality of resistor $R'_1$ symmetrically distributed around the rings and connected to the same terminals 34 which interconnect the opposing collector rings. Similarly, resistors $R'_2$ connect the base rings 26 and 28 to the supply plane 46. These are likewise distributed symmetrically about the base rings and are connected to terminals 36 which interconnect the opposite base rings.

Output coupling to the generator plate structure 25 is effected through a cone-shaped waveguide coupling means comprising an outer cone 60 having an annular flange 62 electrically connected to the outer peripheries of the collector rings 30 and 32, and an inner cone 64 electrically connected at its base to the right-hand generator disk 24 along a continuous annular junction 66. A plurality of interconnecting terminals 38 spaced symmetrically about the emitter planes near the annular junction 66 effect connection of inner cone 64 to the opposite generator plane 22. The apex of outer cone 60 is coupled to the outer conductor 68 of a coaxial cable C, and the apex of inner cone 64 is connected to inner conductor 70 of the cable. The inner and outer conductors of the cable are separated by an annular insulative block 72 at the coupling point.

The cone-shaped waveguide and generator plate structure 25 in combination are secured within the cannister 48 enclosing the power supply by insulative members 76 spaced around the opening 51 in the cannister adjacent the flange 49. These members are shaped to be tightened against the waveguide outer conductor 60 by suitable adjusting screws 78.

Thus, the input energy supplied substantially uniformly and symmetrically to the emitter planes and collector and base rings by the described energy input connections distributed around their circumferences, is extracted from symmetrically oriented continuous output terminals located at the peripheries of the collector rings and the emitter plane. The generated noise energy, resulting from interfering traveling waves propagated around the collector and base rings and primarily about the periphery of the emitter planes, is substantially confined within the annular cavity 65 of the waveguide for transmission to a remote utilization point or system through the annular cavity 74 of the coaxial cable C.

The illustrated input and output energy coupling means are devoted primarily to achieving a symmetry of input and output energy transfer in order to reduce the aforementioned effects of discontinuities in the physical configuration of the system as a whole. It will be recognized that any such coupling means will be characterized by its own restrictions on the transfer of energy in a uniform manner over the entire frequency spectrum. The particular configuration of coupling means will therefore be chosen by consideration of the requirements associated with particular uses to be made of the device. Thus, while the present coupling means are preferred, they are intended to be illustrative only.

Other possible modifications of input and output coupling to the system will be recognized by those skilled in the art. Thus, while the invention has been herein described in terms of a particular embodiment thereof, it will be understood that its scope permits various modifications within the ambit of the principles involved.

I claim as my invention:

1. A random noise generator comprising a wave propagating structure composed of first conductive means including a conductive surface and second conductive means including a closed loop conductor positioned in relation to said surface to have substantially uniformly distributed mutual energy transfer cross-coupling with said surface when said generator is energized; means for coupling a source of energy to said wave propagating structure to establish potential for energy flow through said generator; a plurality of signal translating devices having first control elements connected to said surface and second control elements connected to said closed loop conductor, each device being operable in response to changes in relative control conditions on said elements to generate a pulse propagated as a travelling wave in one of said conductive means, said wave inducing through said cross-coupling a corresponding travelling wave of magnitude sufficient to cause a pulse producing change in relative control conditions on the control elements of at least one other of said devices, whereby interfering travelling waves are generated in said structure causing random triggering of said devices to generate said pulses; and output means coupled to said structure and responsive to the travelling wave energy propagated therein.

2. A random noise generator comprising:

(a) a power source;

(b) a plurality of electron devices, each (i) capable of two conduction states and (ii) having first and second control electrodes;

(c) energy transfer means connecting said devices to said source, including (i) first, and (ii) second closed conductive energy transfer paths interconnecting corresponding control electrodes of the respective electron devices, (iii) means operable to connect each of said paths to said source to establish operating conditions for said electron devices, and (iv) means separate from said devices establishing mutual energy transfer cross-coupling between said paths, said coupling being substantially equally distributed between connections of said electrodes to said paths and of an intensity such that traveling waves in one of said paths caused by changes of state of any of said devices induce corresponding traveling waves in the other of said paths of magnitude capable of causing changes of state in others of said devices, thereby generating interferring traveling waves in said paths causing random triggering of conduction state changes in said devices; and (d) output means coupled to said paths for deriving wave energy therefrom.

3. The random noise generator defined in claim 2 wherein said first energy transfer path comprises a substantially continuous conductive surface, said second energy transfer path comprises a conductive strip forming a continuous loop surrounding said surface and disposed adjacent thereto with substantially uniform spacing throughout.

4. The random noise generator defined in claim 3 wherein said conductive surface is bounded by a circular peripheral edge and said conductive strip comprises a circular ring.

5. The random noise generator defined in claim 4 wherein said conductive surface comprises a disk, said generator includes a second circular ring said rings lie in the plane of said disk and are concentric therewith, one such ring being disposed intermediate said disk and the other ring, and each of said electron devices includes a third electrode connected to said second circular ring.

6. The random noise generator defined in claim 5 wherein said generator includes a sheet of dielectric material and two of such disks and associated rings supported opposing one another, respectively, on opposite sides of said dielectric sheet, the corresponding rings and disks being electrically connected through said dielectric sheet, and wherein said electron devices are connected to said rings and disks on opposite sides of said dielectric sheet.

7. The random noise generator defined in claim 5 wherein said means for connecting said paths to said power source comprises an energy supply plane disposed parallel to said disk and connected to one terminal of said source, and electrical connections between said supply plane and at least one of said conductive transfer paths.

8. The random noise generator defined in claim 5 wherein said output means comprises means having connections respectively to said surface and to said other ring, said connections being substantially symmetrical about the center of said disk.

9. The random noise generator defined in claim 8 wherein said output means comprises a waveguide including an inner conductor connected to said disk and an outer conductor having an annular, substantially continuous connection to said other ring.

10. A random signal generator comprising a plurality of closed conductors, means for coupling a power source to said conductors to establish potential for energy flow through said generator, a plurality of energy gating means having terminals connected to said conductors and operable to switch between from one energy conduction state to another in response to changes in relative voltage conditions on said terminals, thereby rendering an output pulse propagated as a traveling wave in one of said conductors, separate means establishing uniformly distributed energy transfer cross coupling between said conductors throughout their length whereby said traveling wave induces in another of said conductors a second traveling wave, the net collective effect of travelling waves thereby generated in said conductors being to randomly trigger changes of state in said gating means, and output means coupled to said conductors and responsive to the traveling wave energy propagated by said changes of state.

11. The random signal generator defined in claim 10 wherein said conductors comprise three separate spaced conductors and said energy gating means comprise three-electrode transistors of the same type having their electrodes connected to said conductors in common-emitter amplifier configuration with respect to said power source and said output means.

12. The random signal generator defined in claim 11 wherein said conductors include a surface of conductive material and having a curvilinear peripheral edge and first and second conductive loops spaced uniformly from said edge and from one another at substantially all points along their respective lengths, said first conductor being disposed intermediate said surface and said second conductor.

13. The random signal generator defined in claim 12 wherein said output means includes waveguide coupling means having an inner conductor connected to said surface, and an outer conductor connected to said second conductor.

References Cited

UNITED STATES PATENTS

| | | | |
|---|---|---|---|
| 2,960,664 | 11/1960 | Brodwin | 331—78 |
| 3,072,848 | 1/1963 | Socio | 331—78 |

OTHER REFERENCES

Gootee, Radio News, Ring Oscillators, 1–1947, pp. 48–50, 118, 120, 122.

Electronics: p. 33, Jan. 31, 1964.

RODNEY D. BENNETT, Jr., Primary Examiner

C. E. WANDS, Assistant Examiner